July 25, 1933.  C. G. STRANDLUND  1,919,915
HITCH DEVICE
Filed Oct. 29, 1928
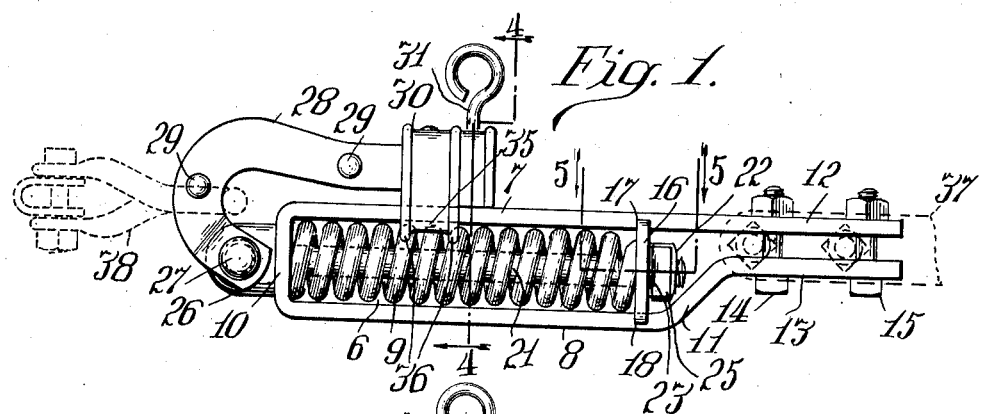
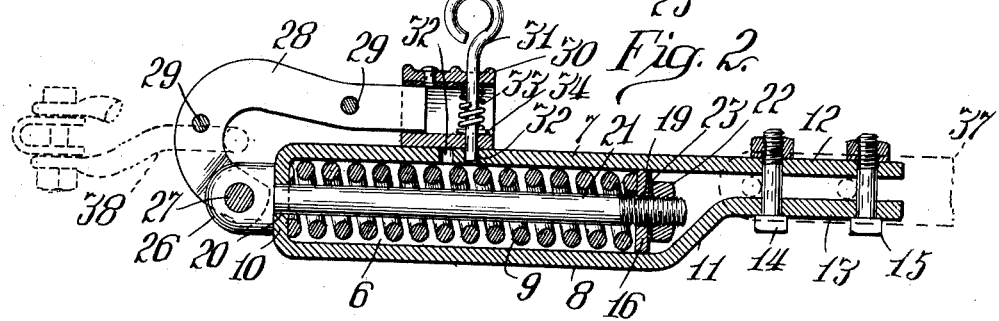
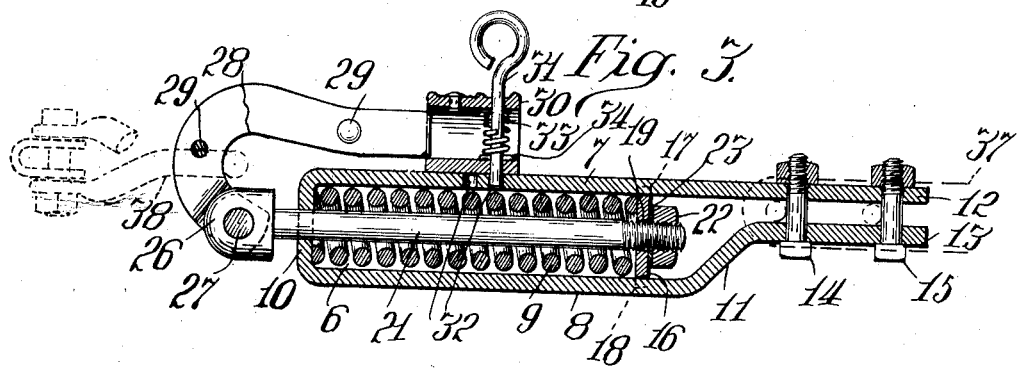
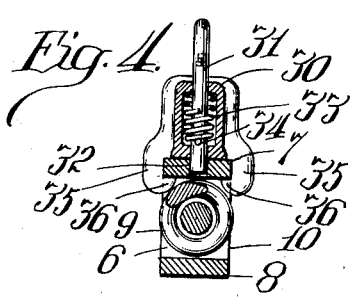
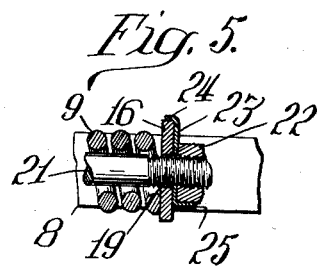
Inventor.
Carl G. Strandlund,
By Brown, Jackson, Boettcher & Dienner.
Attorneys
Witness
Milton Lenoir Patented July 25, 1933

1,919,915

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

HITCH DEVICE

Application filed October 29, 1928. Serial No. 315,679.

This invention relates to devices such as are used for hitching a load to be drawn to the drawing element, and it has for its principal object to provide a hitch device that will remain operative under normal operating conditions, but will automatically release the drawing element from the load should the latter become abnormally great due to its encountering some unusual obstacle, thereby minimizing the danger of breakage. In the drawing I have shown my invention embodied in a hitch device designed more particularly for use in connecting agricultural implements such as plows, planters, harvesters, &c., or other earth working machinery, with a draft element such as a tractor or team, but it should be understood that it may be embodied in hitch devices designed for a variety of other uses, and that the claims hereinafter made are not intended to be restricted to the specific construction shown and described except in so far as they may be directed to particular features of such construction.

In addition to my primary object, further objects are to provide a hitch device that may readily be adjusted to vary the force required to release the hitch; to provide a hitch device that may be employed to vary the height of the hitch; and one that may be reversed, or turned end for end, so that either end may be connected either to the drawing element or to the load, as desired. I accomplish these objects as illustrated in the accompanying drawing and hereinafter described. What I regard as new is set forth in the claims.

In the drawing,—

Fig. 1 is a side elevation of a hitch device embodying my improvements;

Fig. 2 is a longitudinal vertical section thereof with some parts in elevation;

Fig. 3 is a view similar to Fig. 2 showing the position of the parts under abnormal load resistance and just before the point of release is reached;

Fig. 4 is a vertical cross-section on line 4—4 of Fig. 1; and

Fig. 5 is a partial longitudinal section on line 5—5 of Fig. 1.

In the design shown my improved hitch comprises a frame or bracket composed of a comparatively narrow metal bar bent back upon itself between its ends to form a rectangular pocket 6 open at the sides and bounded at the top by a straight bar 7, and at the bottom by a bar 8, the greater portion of which is parallel with the bar 7 and is spaced therefrom far enough to admit a compression spring 9 between said bars.

The upper and lower bars 7, 8 are joined at one end by an upright bar 10 which constitutes what may be termed the inner end wall of the pocket. The free end portion of the lower bar 8 is bent toward the bar 7, as shown at 11, to bring the extreme end of the bar 8 closer to the corresponding end of the upper bar 7, these two end portions being parallel as shown at 12, 13. Bolts 14, 15, connect these parallel end portions of the two bars and serve as a means of attachment of the hitch device either to the load or to the drawing element, as may be preferred.

Mounted to slide longitudinally of the pocket 6 between the bars 7, 8 is a transverse plate 16, which is somewhat wider than said bars, and has its upper and lower margins notched to receive said bars. The vertical diameter of this plate at its end portions is somewhat greater than the distance between the bars 7, 8 so that, when notched, shoulders 17, 18 are provided that overlap the sides of said bars and hold the plate against lateral displacement. The plate 16 is provided with a central hole 19 which alines with a hole 20 in the end wall 10, and through these holes extends a draft member, preferably in the form of a bolt 21, upon the inner end of which is screwed a nut 22 that abuts against the outer face of the plate 16. This nut is normally locked against rotation by a locking plate 23, as shown in Fig. 5, that fits upon the bolt 19 between the nut 22 and the bolt 16, and has one end 24 that may be bent over the side margin of the plate 16 and another end 25 that may be bent over a side face of the nut 22. Obviously the bent ends of the locking plate 23 prevent rotation of the nut on the bolt.

The opposite end of the bolt 21 is provided with a head 26 that is adapted to bear against the outer face of the end wall 10, as best shown in Fig. 2. Pivotally connected with this head by a pivot 27 is a releasable hitching connection in the form of a curved arm 28, preferably composed of two similar flat bars placed side by side and secured together by rivets 29. The ends of these bars that are attached to the head 26 are bent away from each other far enough to overlap the sides of the head, so that they embrace it at the point where they are connected to it by the pivot 27, thus providing a strong laterally rigid connection between these members.

The free end of the arm 28 is adapted to be swung back over the top bar 7 into proximity thereto, as shown in Figs. 1 and 2, and to be engaged by a holding device or keeper in the form of a sleeve 30 that is slidably mounted on said top bar and is adapted to be held in different positions of adjustment thereon by a pin 31. As plainly shown in Fig. 2, said pin extends down through the sleeve 30 near one end thereof and into one or another of several holes 32 provided in the top bar 7, thereby locking the sleeve against endwise movement on said bar. A spring 33 mounted on the pin 31 within the sleeve 30 bears against a cross-pin 34 in the pin 31 and tends to move said pin down into the hole 32 with which it registers. The sleeve 31 is held against lateral displacement on the bar 7 by means of lips 35 that depends at its opposite sides and bear against the side margins of the bar 7, said lips being provided with inwardly projecting lugs 36 that extend under the margins of said bar.

By this means the sleeve or keeper 30 is held against lateral movement with respect to the bar 7, but when the pin 31 is out of operative position, may be moved endwise therealong. The bore of the sleeve 30 is such that it is adapted to receive the free end of the arm 28 in the manner shown in Fig. 2, and obviously by moving said arm endwise with respect to the sleeve it may be released therefrom and permitted to swing around in a counterclockwise direction as viewed in Figs. 1 to 3.

It will be noted that as the spring 9 bears at one end against the end wall 10 of the pocket 6 and at the other end against the plate 16, it tends to hold the head 26 of the draft bolt 21 against the outer face of the end wall 10, and consequently to hold the free end of the arm 28 in engagement with the sleeve 30, and that by applying force either to the frame or to the draft bar in such direction as to compress the spring 9, the arm 28 may be moved out of engagement with the sleeve 30, thereby releasing it and permitting it to swing over out of operative position.

In the drawing the frame is represented as being connected to the load, indicated by the dotted lines 37, and the arm 28 is represented as being hooked through a clevis 38 by which it is connected to the draw bar of a tractor or to the whiffletrees of a team, but this arrangement may be reversed if desired. Under normal operating conditions the resistance of the load compresses the spring 9 to some extent and moves the free end of the releasable hitch connection or arm 28 slightly toward the point at which it will release or trip, but not far enough to prevent its being properly held in operative position by the holding device or sleeve 30.

If, however, the resistance of the load should increase abnormally,—for example, if in plowing the plow should strike a serious obstacle,—the spring 9 will be compressed sufficiently to permit the arm 28 to move out of the sleeve 30, whereupon it will trip over away from the frame and permit the clevis to slip off, thereby releasing the drawing element from the load.

The extent of movement of the two principal members of the hitch device with respect to each other necessary to release the arm 28 may be varied by shifting the position of the sleeve 30 lengthwise of the bar 7, as provided for by the pin 31 and the holes 32, and the tension of the spring 9 may be adjusted by first releasing the arm 28 and then rotating the bolt 21 to change the position of the nut 22 upon it, and thereby vary the effective length of the pocket 6. Adjusting the tension of the spring 9 varies the force necessary to release the arm 28 without changing the extent to which said arm projects into the sleeve 30, and varying the position of said sleeve on the bar 7 varies the extent of movement of the parts necessary to effect the release of the arm 28, and in that way varies the amount of force necessary to bring about that result.

The hitch device may be arranged either as shown in the drawing, with the bar 7 on top, or it may be reversed so that said bar is at the bottom, in which case the spring 33 functions to hold the pin 31 in operative position against the action of gravity. This reversal of the hitch device provides for adjusting the height of the hitch, since in the one case the arm 28 lies above the frame and in the other case it lies below it.

From the foregoing description it will be seen that the frame and the draft bolt 21 constitute associated members that are adapted to be connected respectively with a drawing element and with the load, and are capable of being moved relatively to each other by the force of the draft, such movement being resisted by the spring 9; also that the hitching connection, or arm 28, and the holding member, or sleeve 30, constitute a trip device, one part of which is connected with the frame and the other part with the draft bolt, and that such trip device comprises inter-engaging parts that are movable with respect to each other into disengaging position by abnormal movement of the members of the hitch device under the force of the draft. While in the illustrated construction the holding member or sleeve 30 is mounted on the frame and is normally held against movement thereon, while the hitching connection or arm 28 is connected with the draft bolt 21 to move therewith, my invention, generically considered, includes a reversal of this arrangement, since obviously the arm 28, or its equivalent, could be connected with the frame, and the holding device 30 could be connected with the draft bolt 21 to move therewith into or out of cooperative relation to the hitching connection. Various other modifications may also be made within the scope of my invention as defined by the appended claims, as will be apparent to those skilled in the art.

Having thus described the embodiment of my invention illustrated in the drawing, what I claim is:

1. A hitch device comprising an open sided U-shaped frame formed of strap stock, a draft member extending through one end of said frame and longitudinally between the extended legs thereof, resilient means mounted on said member, guide means connected with the inner end of said member and adapted to hold the resilient means thereon and in abutting engagement with said frame, said guide means comprising a substantially rectangular washer slidably engaging the legs of said frame and extending outwardly of the open sides thereof, said washer having oppositely related projections on the extended portions thereof for overlapping and engaging the side edges of said frame legs to guide said member, a hitch connection pivotally connected with the outer end of said member and adapted to swing over the frame, and a holding device adjustably mounted on one of the frame legs and adapted to engage one end of said arm to hold the same in operative position, said arm being movable out of engagement with said holding device by excessive longitudinal movement of said member under the force of the draft.

2. The combination with a releasable hitch device including a frame having openings therein, spring means carried thereby, and an arm pivotally supported by said spring means, of a holding device in the form of a sleeve slidably mounted wholly upon one side of said frame and adapted to engage one end of said arm to hold the same in operative position, said arm being movable out of engagement with said sleeve by excessive draft force, a locking pin extending transversely through said sleeve and adapted to engage any one of the openings in said frame for holding said sleeve in fixed relation to said frame, said pin having stop means wholly confined within said sleeve and comprising a cross-pin adapted to engage the inner wall of the sleeve for limiting the movement of said locking pin, and a spring disposed within the sleeve and about said locking pin and acting between the inner wall of said sleeve and said stop means for normally holding said locking pin in operative position.

3. The combination with a releasable hitch device including a frame, spring means carried thereby, and an arm pivotally connected with said spring means, of a holding device adjustably mounted upon the frame and adapted to engage one end of said arm to hold the same in operative position, said holding device comprising a sleeve member to receive the end of the arm and a flat base portion contacting throughout its width with one face of said frame, projections extending from said base portion and engaging another face of said frame to firmly hold said base portion upon said frame, and a wear plate mounted within the sleeve member to sustain the wear occasioned by the end of said arm under the normal force of draft, said arm being movable out of engagement with the holding device by excessive longitudinal movement under an excessive draft force.

CARL G. STRANDLUND.